C. C. HOLDEN.
THREE-WHEEL AUTO.
APPLICATION FILED JUNE 12, 1912.
1,049,092.
Patented Dec. 31, 1912.
2 SHEETS—SHEET 1.
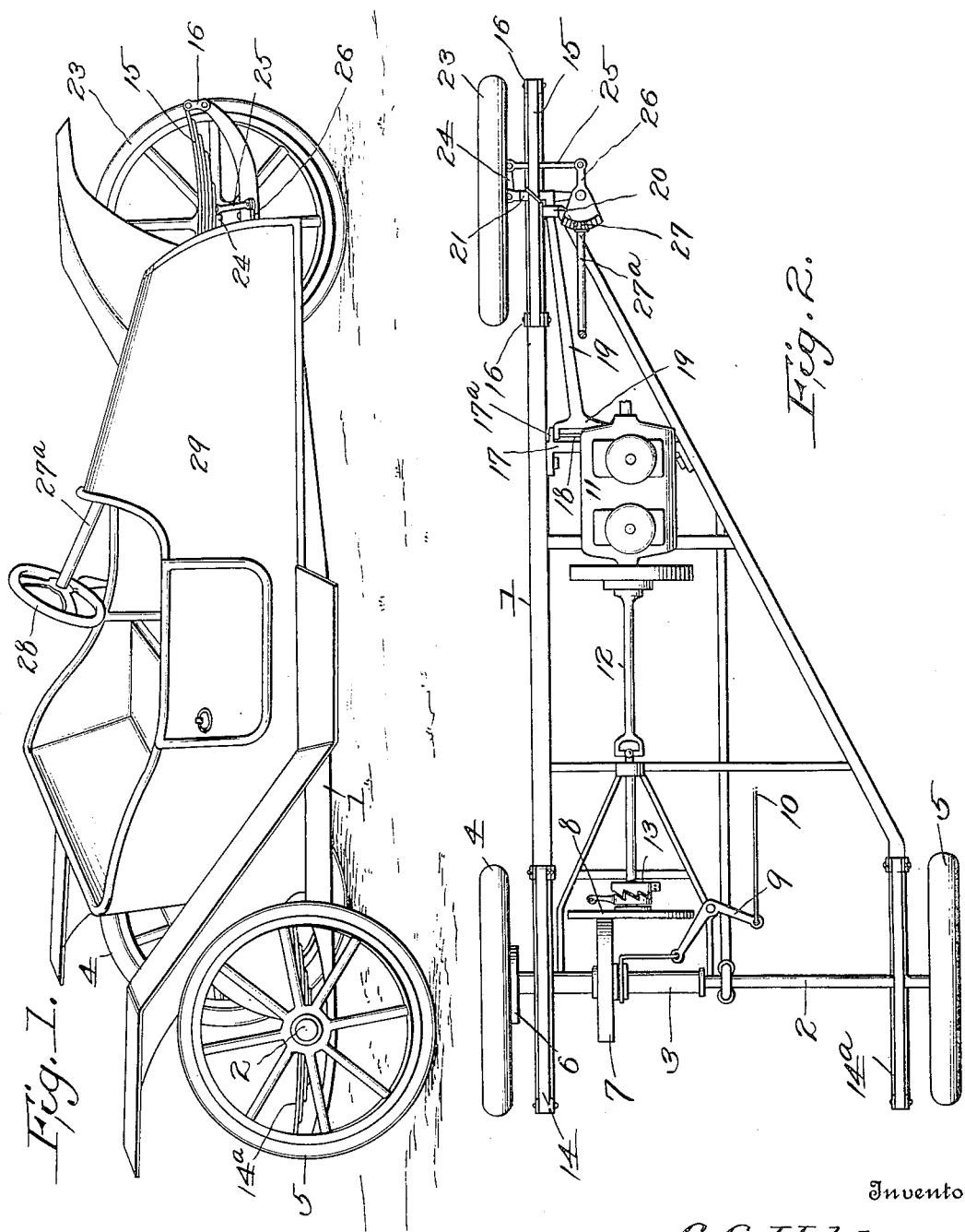
Witnesses
Inventor
C. C. Holden
By
Attorney C. C. HOLDEN.
THREE-WHEEL AUTO.
APPLICATION FILED JUNE 12, 1912.
1,049,092.
Patented Dec. 31, 1912.
2 SHEETS—SHEET 2.
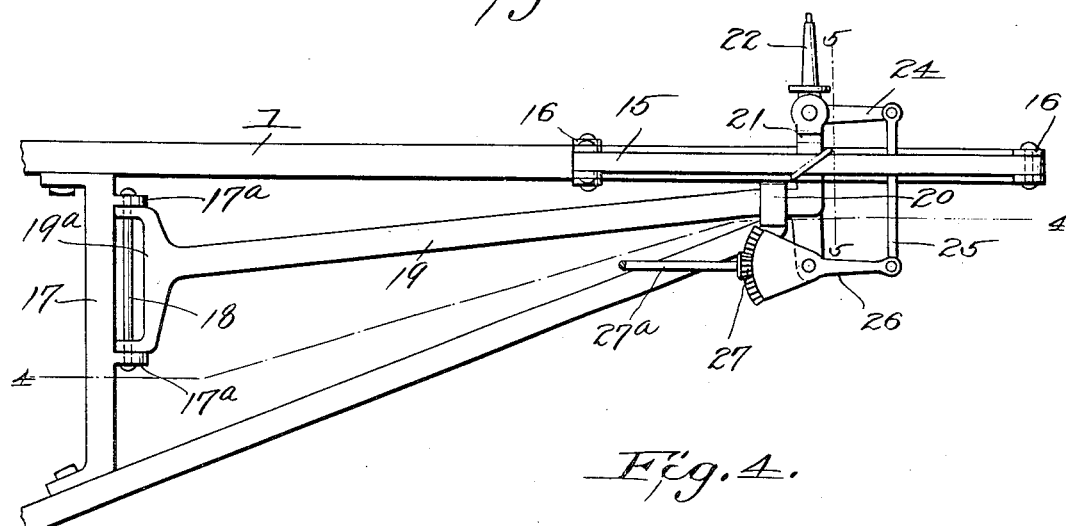
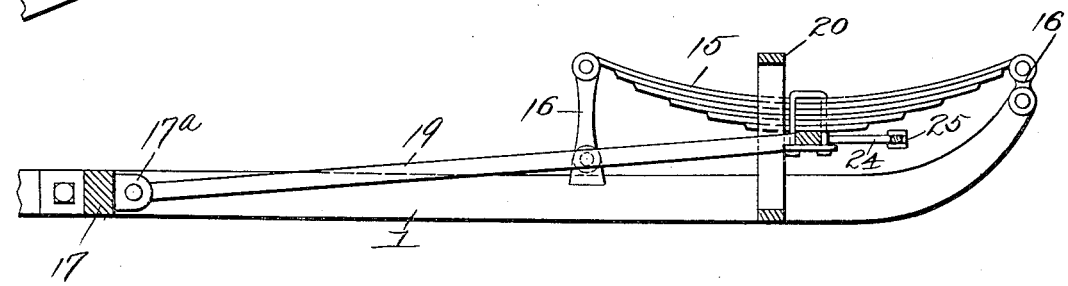
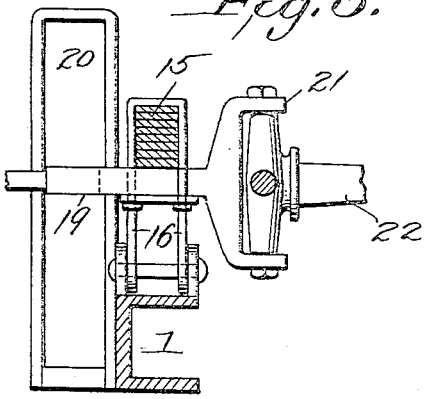
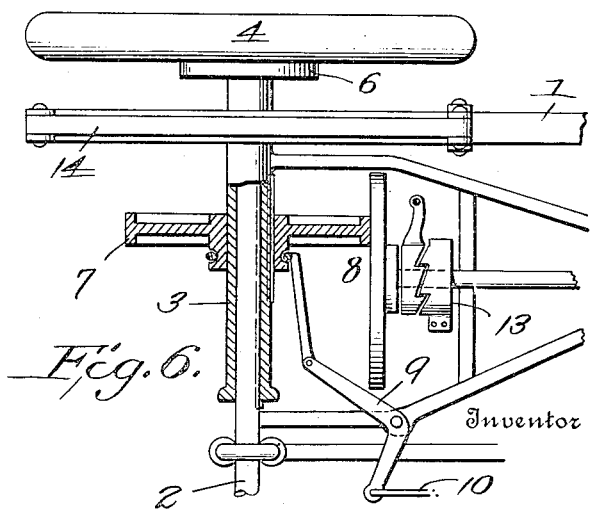

UNITED STATES PATENT OFFICE.

CLEM CLARENCE HOLDEN, OF FLINT, MICHIGAN, ASSIGNOR OF ONE-HALF TO EPHRAIM D. RICE, OF FLINT, MICHIGAN.

THREE-WHEEL AUTO.

1,049,092. Specification of Letters Patent. Patented Dec. 31, 1912.

Application filed June 12, 1912. Serial No. 703,252.

*To all whom it may concern:*

Be it known that I, CLEM C. HOLDEN, a citizen of the United States, residing at Flint, in the county of Genesee and State of Michigan, have invented a new and useful Improvement in Three-Wheel Autos, of which the following is a specification.

This invention relates to a three-wheel motor vehicle, and the object of the invention is to reduce the weight of the machine by omitting one front wheel, front axle and other parts rendered unnecessary by the adoption of a three-wheel type of machine.

A further object of the invention is to keep all of the wheels in the regular wheel track of the road-way, thus avoiding the objection against the ordinary tricycle form of vehicle in which one of the wheels travels in the middle of the road-way and between the regular wheel route.

A further object of the invention is to increase the ease by means of which the machine is handled by throwing a great majority of the weight upon the steering and driving wheels, and at the same time keeping these wheels in alinement with each other.

With these objects in view, the invention consists of the construction hereinafter described, pointed out in the claims and shown in the accompanying drawings, in which—

Figure 1 is a perspective view of an automobile constructed in accordance with my invention. Fig. 2 is a plan view of the device with the body removed. Fig. 3 is an enlarged detail plan of the front portion of the frame, illustrating the steering and supporting mechanism. Fig. 4 is a side elevation of the forward portion of the frame and parts carried thereby. Fig. 5 is a cross section upon the line 5—5 of Fig. 3. Fig. 6 is a plan view of a portion of the transmission mechanism, parts being shown in section.

In constructing the device, I employ a triangular shaped frame 1, provided with a rear axle 2, and upon said axle is mounted a sleeve 3 upon which is fixed a drive wheel
4. Upon the opposite end of the rear axle is an idler wheel 5, the wheel 5 being adapted to travel in the usual wheel route upon one side of the roadway, while the drive wheel 4 travels in the other wheel route.
Slidably keyed upon the sleeve 3 is a friction wheel 7, which is in engagement with a friction disk 8, the disk being arranged at right-angles to the wheel 7.

In order to move the wheel 7 across the face of the disk 8, I provide a bell crank 9 mounted in any suitable manner upon a portion of the frame 1 and operated by means of a suitable rod 10. One end of the bell crank is of course suitably connected to the hub portion of the wheel 7. A motor 11 of any desired type is suitably mounted upon the frame and power is transmitted from said motor to the disk 8 by any preferred form of transmission device, such as a universal shaft 12 and friction thrust 13.

It will of course be understood that I do not claim any particular construction of driving mechanism and therefore do not wish to be limited to any particular form of gearing or any specific means for driving the wheel 4.

Upon the rear portion of the frame are hung semi-elliptic springs 14 and 14$^a$, and at the forward end of the frame, that is at its apex portion is hung a similar spring 15 which is in horizontal alinement with the spring 14. These springs are hung at their ends between suitable brackets 16 carried by portions of the frame.

Adjacent the apex portion of the frame is a cross bar 17 having forwardly projecting lugs 17$^a$ between which is mounted a rod 18 and upon said rod is pivoted the rear end of an arm 19. This arm at its rear end is provided with curved branches or ears 19$^a$ through which the rod 18 loosely passes. This permits vertical movement of the said arm with the rod as a pivot pin but prevents lateral movement of the arm.

Carried by the apex of the frame and adjacent the spring 15 is a vertically arranged rectangular bracket or loop 20 through which the arm 19 passes and which serves as a guide for the forward end of the arm to work in. At its forward end the arm is angled and passes beneath the spring 15 to which it is secured by any suitable means of clip or in any other desired manner. Pivoted to the outer end of this arm, which takes the place of a front axle, is a spindle 22 upon which is mounted the front wheel 23, said wheel being in alinement with and traveling in the same wheel route as the drive wheel 4. The spindle 22 carries a forward extending steering member 24, which is connected by a link 25 to a pivoted rack segment 26. This segment has its rack portion engaged by a suitable cog wheel 27 carried at the lower end of the steering rod 27ª the upper end of which carries the usual steering wheel 28. A body 29 of any suitable design but having substantially the tri-angular shape of the frame 1 has its forward apex portion mounted upon the spring 15 and its rear corner portions mounted upon the springs 14 and 14ª. It will be obvious that from this mounting the front wheel 23 is permitted a vertical movement with the rise and fall of the arm 19, and said arm also takes up all side thrust from the steering mechanism.

What I claim is:—

1. In an automobile a triangular frame, a body arranged thereupon, suitable springs arranged at the corners of the frame for supporting said body, a pivoted arm arranged adjacent the apex portion of the frame adapted to have a vertical movement, said arm being connected to the spring arranged adjacent said apex portion, a steering wheel supported from said arm, and rear wheels, one of said rear wheels being in alinement with the said steering wheel.

2. In an automobile of the kind described, a triangular frame, rear wheels, means for driving one of the said wheels, an arm pivotally mounted in the apex portion of the frame and having its front end bent outwardly, a wheel spindle pivotally connected to the end portion of said arm, a steering wheel, means for connecting said steering wheel to said spindle, a body, and springs supporting said body, the said pivoted arm being connected to one of said springs.

3. In a three wheel automobile, a rear drive wheel, a front wheel in alinement with the drive wheel, an arm pivotally mounted in the frame, the forward portion of said arm being bent at an angle, a spindle pivotally connected to the angled portion of the arm, the front wheel being mounted upon said spindle, the said arm being adapted to have a vertical swinging movement, and means for swinging said spindle upon its pivotal point.

4. A device of the kind described comprising a triangular frame, front and rear wheels, means for driving the rear wheel arranged upon the same side of the frame as the front wheel, a transverse cross bar arranged adjacent the front end of the frame, an arm pivotally connected to said bar and adapted for vertical movement, a vertically arranged guide bracket within which said arm works, the forward end of the arm being angled and forming a front axle, a suitable body supporting spring, said spring being secured to said arm and also to the frame, the front wheel being pivotally connected to the angled portion of the arm, the arm rising and falling with vertical movement of the wheel, said wheel having a movement in a horizontal plane independent of movement of the arm and means for swinging the wheel in a horizontal plane.

CLEM CLARENCE HOLDEN.

Witnesses:
JOHN F. BAKER,
T. M. ATHERHOLD.